United States Patent [19]

Kawawaki et al.

[11] Patent Number: 5,132,924
[45] Date of Patent: Jul. 21, 1992

[54] ELECTRONIC COMPUTER CAPABLE OF REPEATEDLY DISPLAYING THE RESULTS OF A QUOTIENT/REMAINDER CALCULATION

[75] Inventors: Fumiaki Kawawaki, Shiki; Noboru Akizuki, Nara, both of Japan

[73] Assignee: Sharp Kabushiki Kaisha, Japan

[21] Appl. No.: 591,107

[22] Filed: Oct. 1, 1990

[30] Foreign Application Priority Data

Oct. 2, 1989 [JP] Japan .................................. 1-258387

[51] Int. Cl.⁵ .............................................. G06F 7/52
[52] U.S. Cl. .................................. 364/761; 364/710.08
[58] Field of Search ........................ 364/761, 710.08

[56] References Cited
FOREIGN PATENT DOCUMENTS 52-54337   2/1977  Japan .............................. 364/710.08
52-130544 11/1977  Japan .
55-157058 12/1980  Japan .............................. 364/710.08
60-116062  6/1985  Japan .

Primary Examiner—Tan V. Mai
Attorney, Agent, or Firm—Nixon & Vanderhye

[57] ABSTRACT

An improved electronic computer which can produce a quotient/remainder calculation. The computer has first and second memories for storing respectively a dividend and a divisor which are input for execution of division. A quotient/remainder calculation is carried out using the dividend and divisor stored respectively in the first and second memories. The computer further includes third and fourth memories for storing respectively a quotient and a remainder which are obtained in the division calculation. A detector is provided for detecting which of the contents of the third memory or the contents of the fourth memory are displayed. The contents of the third memory or the contents of the fourth memory which have not been detected as being displayed are displayed in response to a predetermined input operation.

4 Claims, 5 Drawing Sheets

Fig. 6

| | OPERATION | DISPLAY | NOTES |
|---|---|---|---|
| A | SELECT F MODE BY SLIDE SWITCH | 0. | DIVISION IS DONE IN MODE OTHER THAN REM MODE |
| B | [1][0][÷][3][=] | 3.3 3 3 3 3 3 3 3 | DISPLAY RESULT OF DIVISION |
| C | SELECT REM MODE BY SLIDE SWITCH | 0. | QUOT/REM CAL IS DONE IN REM MODE |
| D | [1][0][÷][3][=] | 3. | DISPLAY QUOTIENT |
| E | [REM] | 1. | DISPLAY REMINDER | ns
ELECTRONIC COMPUTER CAPABLE OF REPEATEDLY DISPLAYING THE RESULTS OF A QUOTIENT/REMAINDER CALCULATION

BACKGROUND OF THE INVENTION

1. Field of the Invention:

This invention relates to an electronic computer, and more particularly to a small computer such as a portable electronic calculator.

2. Description of the prior art:

Some of conventional small electronic computers, such as portable electronic calculators are capable of performing, besides usual divisions, a calculation to find a quotient Q and a remainder R which satisfy the equation $A = D \cdot Q + R$ (where Q represents an integer) with respect to a dividend A and a divisor D. Hereinafter, this kind of calculation is referred to as "quotient/remainder calculation". Where the term "division" is used herein, it is understood that the term means a usual division.

An example such conventional electronic calculators which can carry out quotient/remainder calculations is shown in FIG. 5. The calculator of FIG. 5 comprises a display 51, a keyboard 52, and a slide switch 53. The keyboard 52 includes numeric keys 52a for entering a number, a divide key 52b for specifying division or quotient/remainder calculation, an [=] key 52c for execution an arithmetic operation such as a division, and a [REM] key 52d for finding a remainder after execution of a quotient/remainder calculation. The slide switch 53 is a switch for selecting the current operation mode. Operation modes selectable by the slide switch 53 are: REM (remainder) mode for carrying out a quotient/remainder calculation, F mode in which the result of calculation is obtained to the maximum possible number of digits for display, and 3-, 2-, and 0-modes in which the fourth, third, and first decimal places of the calculation result are rounded off respectively so that the calculation result is rounded to the third, second, or zero decimal place. Among these operation modes, REM mode is the only mode in which a quotient/remainder calculation can be carried out.

An example of the operation procedures for division and quotient/remainder calculation in the calculator of FIG. 5, and the calculation result displayed are shown in FIG. 6. In FIG. 6, rows A and B show the operation procedure for division. Initially, the slide switch 53 is operated to select F mode in order to obtain a calculation result to the maximum possible number of digits for display (row A in FIG. 6). When keys are operated as shown in row B in FIG. 6, the required division is carried out. Rows C to E in FIG. 6 show the operation procedure for quotient/remainder calculation. First, the slide switch 53 is operated to select REM mode (row C in FIG. 6). Next, keys are operated as shown in row D of FIG. 6, and a quotient resulting from the quotient/remainder calculation is first computed and displayed as it is. The key operation in row D of FIG. 6 is identical with that in the operation for division in row B, but a different operation result is obtained because the selected operation mode is different. Then, the [REM] key 52d is depressed, then the required remainder is obtained and displayed.

As stated above, with the prior art calculator it is necessary to preselect a particular operation mode (REM mode) for execution of a quotient/remainder calculation when such calculation is to be carried out. This complicates the necessary operation procedure. Another problem is that since the result of the quotient/remainder calculation is displayed in two steps, i.e., first with respect to the quotient and then with respect to the remainder, once the remainder is displayed, the quotient cannot be displayed again. This is very inconvenient in that the calculation result cannot be ascertained time and again.

SUMMARY OF THE INVENTION

The electronic computer of this invention, which overcomes the above-discussed and numerous other disadvantages and deficiencies of the prior art, comprises:

first and second memory means for storing respectively a dividend and a divisor which are input for execution of division;

input means which can be operated by the operator; and calculation means for, when said input means is operated by the operator, carrying out a quotient/remainder calculation using said dividend and divisor stored respectively in said first and second memory means.

According to the invention, the electronic computer may further comprise:

third and fourth memory means for storing respectively a quotient and a remainder which are obtained in the calculation by said calculation means;

display means for displaying at least the contents of said third memory means or the contents of said fourth memory means;

detection means for detecting which of the contents of said third memory means or the contents of said fourth memory means are displayed on said display means; and display control means for, when a predetermined input operation is performed, controlling said display means to display the contents of said third memory means or the contents of said fourth memory means which have not been detected by said detection means as being displayed on said display means.

Thus, the invention described herein makes possible the objectives of:

(1) providing an electronic computer which enables a quotient/remainder calculation to be carried out without requiring the selection of any special operation mode;

(2) providing an electronic computer which enables a quotient/remainder calculation to be carried out according to a simple operation procedure; and (3) providing an electronic computer which can display the result of a quotient/remainder calculation a plurality of times.

BRIEF DESCRIPTION OF THE DRAWINGS

This invention may be better understood and its numerous objects and advantages will become apparent to those skilled in the art by reference to the accompanying drawings as follows:

FIG. 6 shows examples of the manner of operation in the calculator of FIG. 5 and operation results displayed.

DESCRIPTION OF THE PREFERRED EMBODIMENTS

Figure 1:
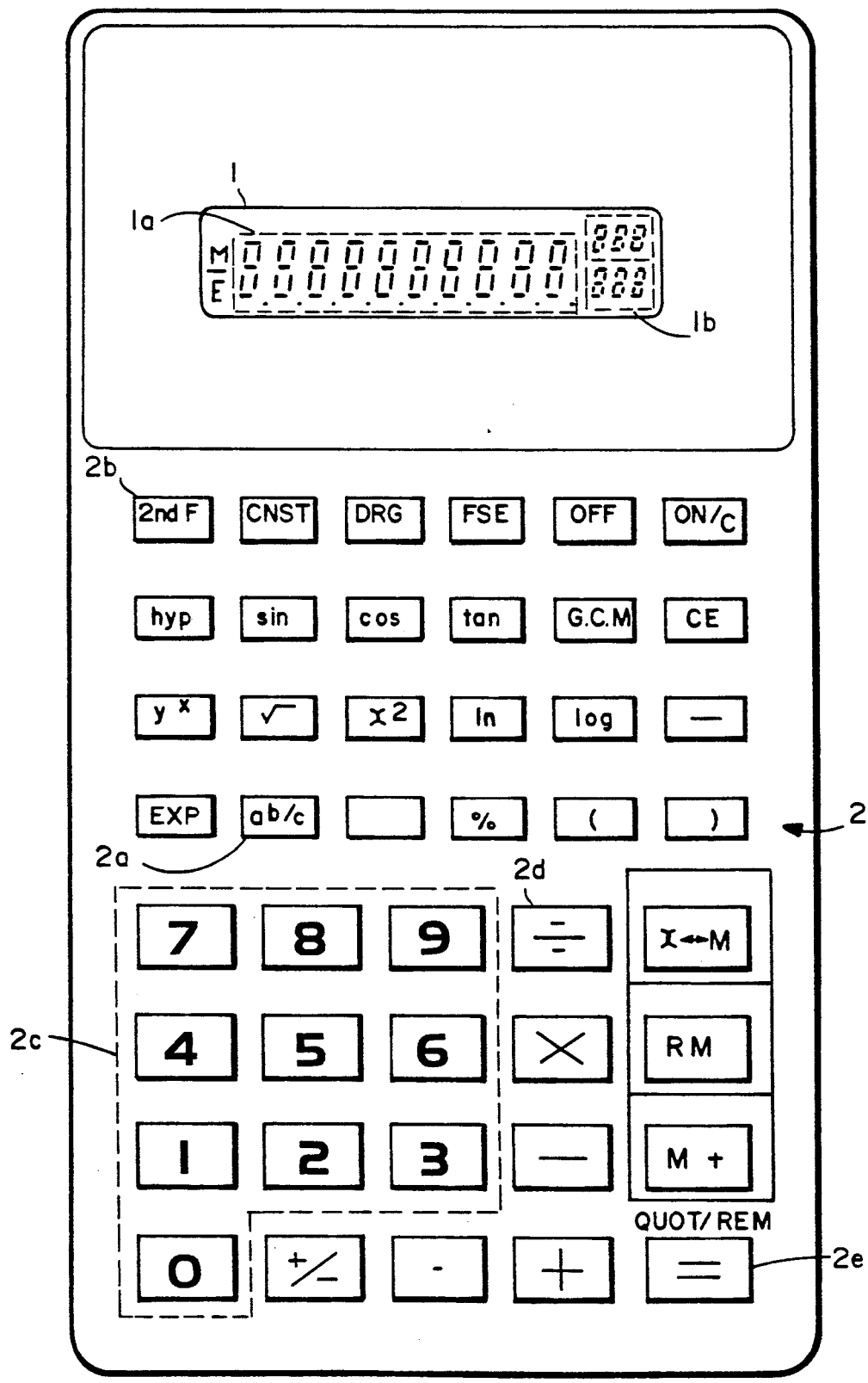
FIG. 1 shows an electronic portable calculator according to the invention.

FIG. 1 shows one embodiment of the invention. This embodiment represents an electronic portable calculator which can carry out varieties of function calculations. In FIG. 1, symbols identifying keys unnecessary for the purpose of describing this embodiment are not illustrated. The electronic calculator of FIG. 1 comprises a liquid crystal display (LCD) 1 and a keyboard 2. The LCD 1 has a main display area 1a and a fraction display area 1b in which a fraction or the like is displayed. The keyboard 2 includes an [$a^b/_c$] key 2a to be used for entry of a fraction as well as for conversion between an improper fraction and a mixed fraction, a [2ndF] key 2b to be used for selection of a second function with respect to various different keys, numeral keys 2c for inputting numerics 0 to 9, a division key 2d for specifying operation for division, and an [=] key 2e for execution of division or the like arithmetic operation. The [=] key 2e has a second function assigned to it for execution of a quotient/remainder calculation and also for performing a changeover between quotient display and remainder display. In the case where the [=] key 2e is used for execution of the second function, the key 2e is referred to as a [QUOT/REM] key.

Figure 2:
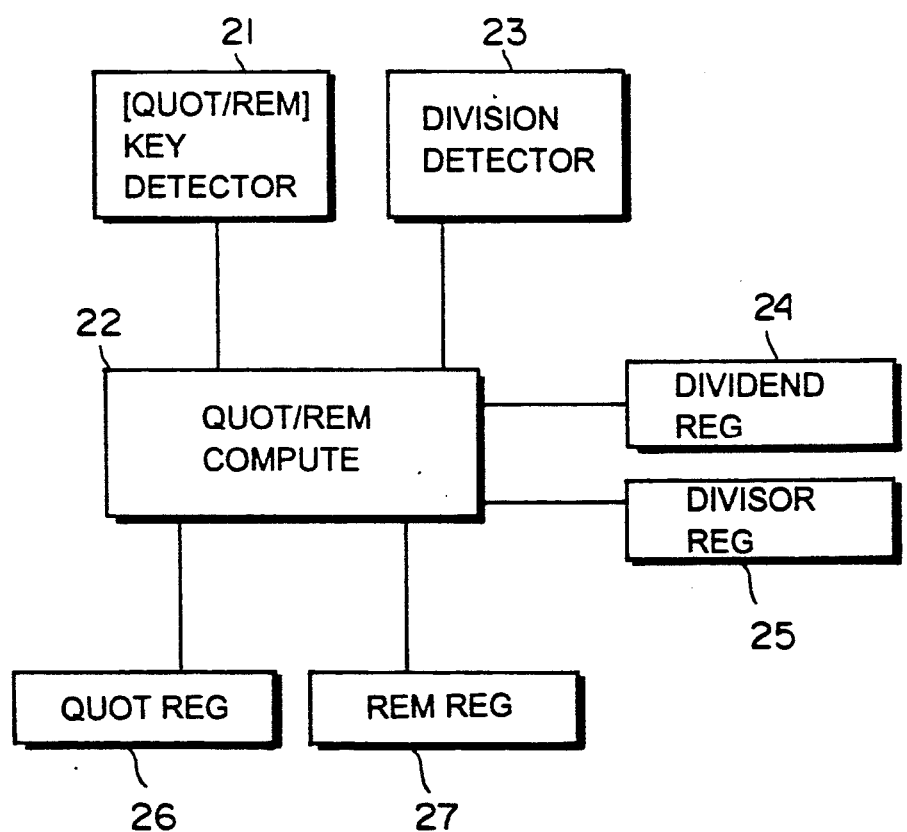
FIG. 2 is a block diagram showing the arrangement of the present embodiment for execution of a quotient/remainder calculation in the embodiment of FIG. 1.

FIG. 2 illustrates the arrangement of the present embodiment for execution of a quotient/remainder calculation. A [QUOT/REM] key detector circuit 21 outputs "1" when the [2ndF] key 2b and the [QUOT/REM] key 2e are depressed successively, and in all other cases it outputs "0". A division detector circuit 23 is set for operation when a division is executed and thereupon it outputs "1". A dividend register 24 and a divisor register 25 are registers for storing therein a dividend and a divisor respectively as inputted thereto when the division is carried out. A quotient/remainder computing unit 22 carries out a quotient/remainder calculation using the contents of both the dividend register 24 and the divisor register 25 when both the output of the [QUOT/REM] key detector circuit 21 and the output of the division detector circuit 23 are "1", and cause the quotient and remainder thus obtained to be stored respectively in a quotient register 26 and a remainder register 27. The quotient/remainder computing unit 22 resets the division detector circuit 23 when it carries out the quotient/remainder calculation. The quotient/remainder computing unit 22 is preferably comprised of software. With such arrangement as described above, the quotient/remainder calculation is carried out when the [QUOT/REM] key detector circuit 21 outputs "1" initially after execution of the division.

Figures 3, 4:
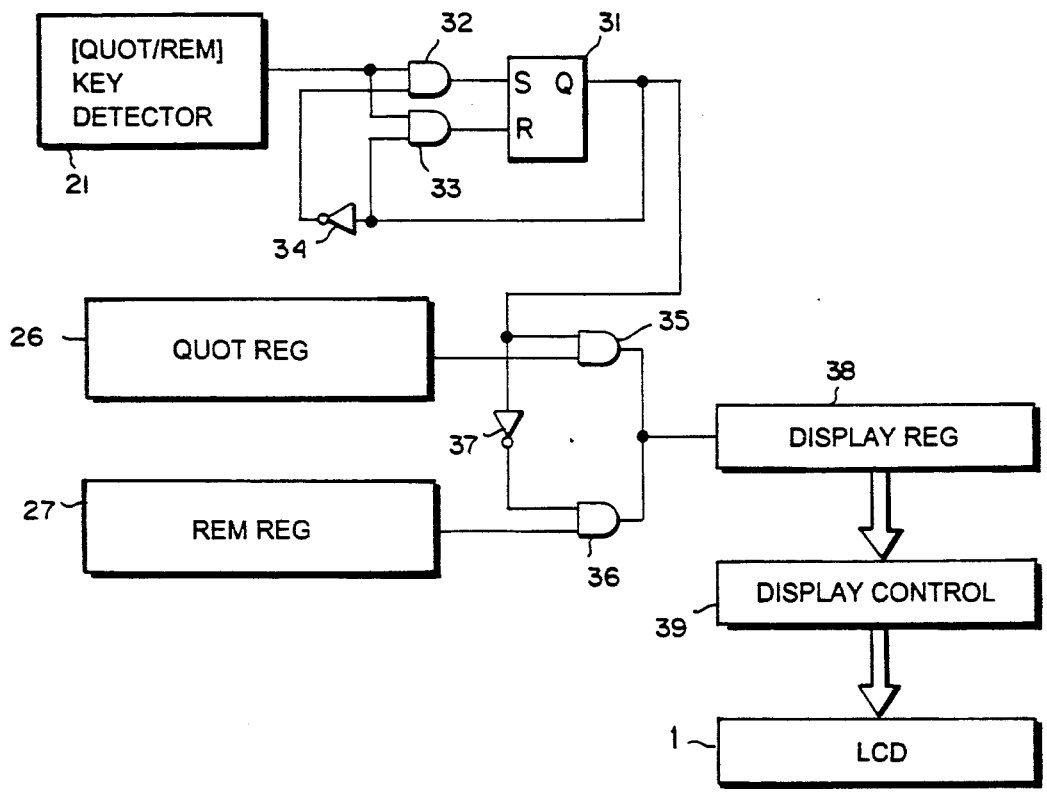
FIG. 3 is a block diagram showing the arrangement for display of the results of a quotient/remainder calculation in the embodiment of FIG. 1.
FIG. 4 shows examples of the manner of operation in the embodiment and operation results displayed.
Figure 5:
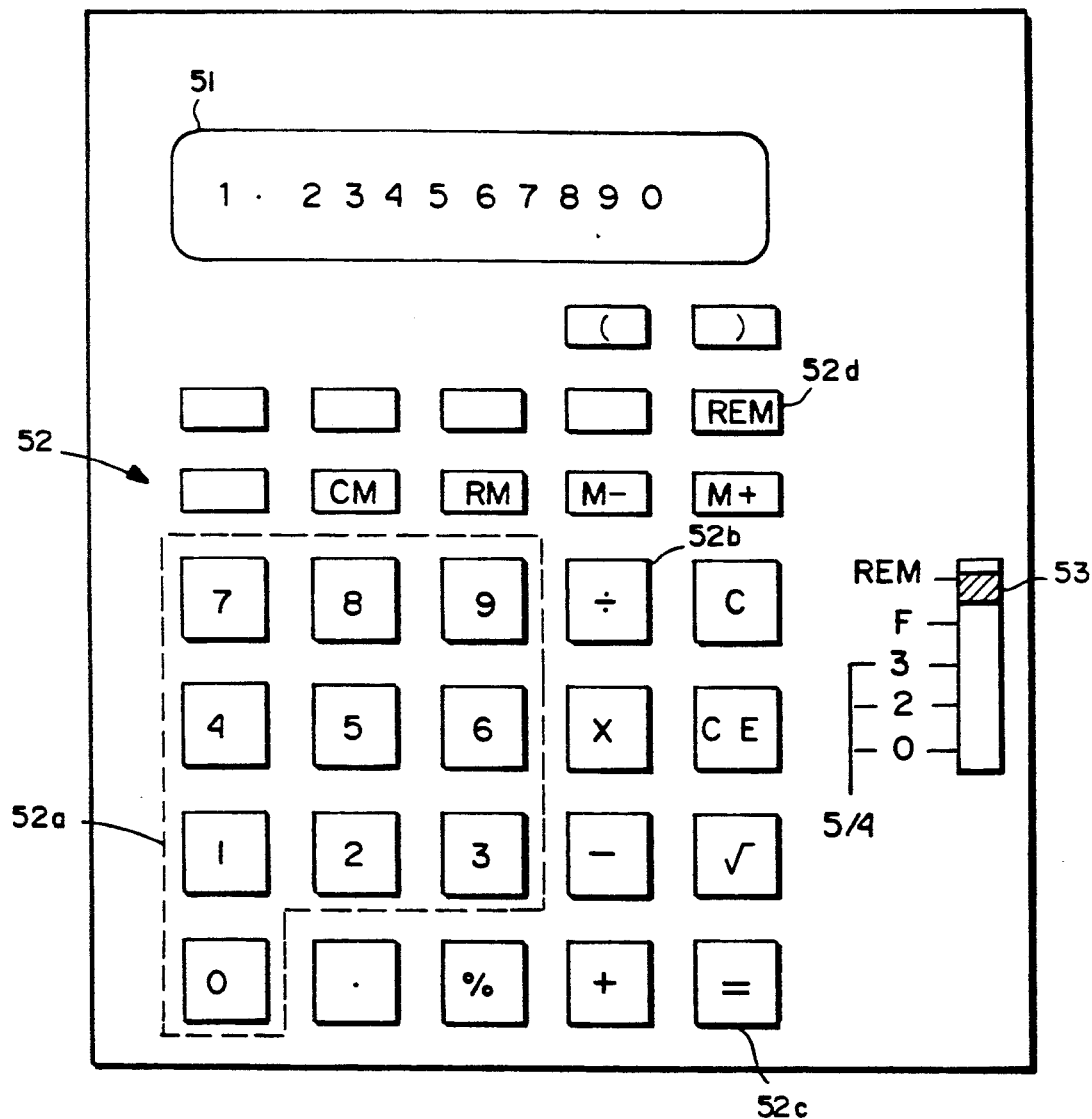
FIG. 5 shows a conventional electronic portable calculator.

FIG. 3 shows the arrangement for display of the results of a quotient/remainder calculation. The [QUOT/REM] key detector circuit 21 is same as the one shown in FIG. 2, and the output of the circuit 21 is applied to one input terminal of an AND gate 32 and also to one input terminal of an AND gate 33. The output of the AND gate 32 is applied to a set terminal of a flip-flop 31, while the output of the AND gate 33 is applied to a reset terminal of the flip-flop 31. The output of the flip-flop 31 is applied to the other input terminal of the AND gate 32 via an inverter 34, and the output of the flip-flop 31 is also applied to the other input terminal of the AND gate 33. Therefore, the output of the flip-flop 31 changes over from "0" to "1" or from "1" to "0" each time the [QUOT/REM] key detector circuit 21 outputs "1". A gate 35 transmits the contents of the quotient register 26 to a display register 38 when the output of the flip-flop 31 is "1". The output of the flip-flop 31 is also applied to a gate 36 through an inverter 37, and, therefore, the gate 36 transmits the contents of the remainder register 27 to the display register 38 when the output of the flip-flop 31 is "0". A display control unit 39 causes the contents of the display register 38 to be displayed on the LCD 1.

According to the embodiment having the foregoing arrangement, the quotient stored in the quotient register 26 is displayed on the LCD 1 when the output of the flip-flop 31 is "1", while the remainder stored in the remainder register 27 is displayed on the LCD 1 when the output of the flip-flop 31 is "0". Therefore, assuming that the flip-flop 31 is reset by adequate means (not shown) when a division operation is executed, the output of the flip-flop 31 becomes "1" when the [QUOT/REM] key detector circuit 21 outputs "1" intially after the execution of the division, and accordingly the quotient stored in the quotient register 26 is displayed as such. Thereafter, quotient display and remainder display change over from the one to the other each time the [QUOT/REM] key detector circuit 21 outputs "1".

In this embodiment, both the quotient/remainder calculation function and the function of changeover from quotient display to remainder display and vice versa are assigned to one key, i.e., the [QUOT/REM] key 2e. Alternatively, however, these two functions may be assigned to separate keys.

FIG. 4 illustrates examples of the manner of operation with respect to the present embodiment and operation results displayed. When key operation is made as exemplified in row A, a division operation is carried out and the results of the operation are displayed as such. Nextly, the [2ndF] key 2b and the [QUOT/REM] key 2e are depressed successively as shown in row B, whereupon a quotient/remainder calculation is carried out using a dividend "10" and divisor "3" which have been input for execution of the division operation, the quotient "3" of the calculation results being displayed. Again, the [2ndF] key 2b and the [QUOT/REM] key 2e are depressed successively, whereupon the remainder "1" is displayed in place of the quotient. Thereafter, as shown in rows D to E, the quotient and the remainder are displayed alternately each time the [2ndF] key 2b and the [QUOT/REM] key 2e are depressed successively.

According to the present invention, there is provided an electronic computer which can perform a quotient/remainder calculation simply by operating input means after execution of a division operation and without the necessity of selecting a special operation mode, and which affords greater ease of operation. Therefore, the electronic computer of the invention makes it possible to carry out quotient/remainder calculations in a very simply way, and precludes any operational error which might otherwise easily occur such that failing of the select a particular operation mode the desired computation cannot be achieved. Further, according to the invention, the quotient and the remainder, both of which represent the results of a quotient/remainder calculation, can be repeatedly displayed in simple operation procedures. In an embodiment where same input means are employed both for instructing a quotient/remainder calculation and for switching over from quotient display to remainder display and vice versa, the number of input means required for obtaining the above mentioned functional benefits can be reduced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic computer comprising:

first and second memory means for storing respectively a dividend and a divisor which are input for execution of division;

input means which is operated by the operator, said input means including first indicating means for indicating a division calculation and second indicating means for indicating a quotient/remainder calculation; and calculation means for, when said second indicating means is operated by the operator, carrying out a quotient/remainder calculation using said dividend and divisor stored respectively in said first and second memory means.

2. An electronic computer according claim 1, wherein said computer further comprises:

third and fourth memory means for storing respectively a quotient and a remainder which are obtained in the calculation by said calculation means;

display means for displaying at least the contents of said third memory means or the contents of said fourth memory means;

detection means for detecting which of the contents of said third memory means or the contents of said fourth memory means are displayed on said display means; and display control means for, when a predetermined input operation is performed, controlling said display means to display the contents of said third memory means or the contents of said fourth memory means which have not been detected by said detection means as being displayed on said display means.

3. An electronic computer as in claim 1 further comprising:

display means responsive to said calculation means for displaying either said quotient or said remainder.

4. An electronic computer as in claim 3 wherein said display means includes means for detecting which of said quotient or remainder is displayed and for causing the non-detected one of said quotient or remainder to be displayed in response to a predetermined operation on said input means.

* * * * *